United States Patent [19]
Ryder

[11] 3,737,268
[45] June 5, 1973

[54] MOLDING APPARATUS
[75] Inventor: Francis E. Ryder, Barrington, Ill.
[73] Assignee: Value Engineered Components, Inc., Streamwood, Ill.
[22] Filed: June 9, 1971
[21] Appl. No.: 151,237

[52] U.S. Cl............425/192, 425/444, 425/DIG. 58, 249/59, 249/68
[51] Int. Cl. ...............................................B29f 1/14
[58] Field of Search.....................425/182, 186, 436, 425/444, 450, 451, 247, 242, DIG. 51, 190–192; 249/59, 66–69, 76

[56] References Cited
UNITED STATES PATENTS

| 2,564,615 | 8/1951  | Tallberg.............................425/450   |
| 3,160,919 | 12/1964 | Carter ............................425/450 X |
| 2,217,661 | 10/1940 | Anderson..........................249/59 X    |
| 2,583,093 | 1/1952  | Emmert et al.....................425/450 X   |
| 3,004,291 | 10/1961 | Schad..................................425/450 |
| 3,197,825 | 8/1965  | Hammond.......................425/242 X       |
| 3,388,431 | 6/1968  | Aoki...................................249/59 X |

Primary Examiner—J. Spencer Overholser
Assistant Examiner—Michael O. Sutton
Attorney—Olson, Trexler, Wolters & Bushnell

[57] ABSTRACT

Molding apparatus comprises companion mold members with mold cavity insert assemblies removably mounted thereon. The insert assemblies comprise blocks which form the mold cavity portions and which are separated by divider bars, the latter having transverse runners communicating the mold sprue with the cavity portions of the block. The insert assemblies on one of the mold members have ejector mechanisms which can be readily coupled to the ejector drive of the apparatus. The ejector drive may also include an ejector pin that ejects the molded runner portion in the divider bar. The ejector mechanism for the inserts may be tubular or solid pins, or rotatable members for unscrewing threaded molded parts from the mold.

13 Claims, 15 Drawing Figures

PATENTED JUN 5 1973 3,737,268
SHEET 1 OF 5
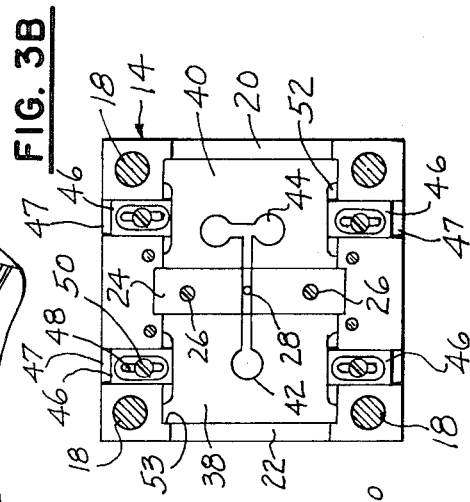
FIG. 3B
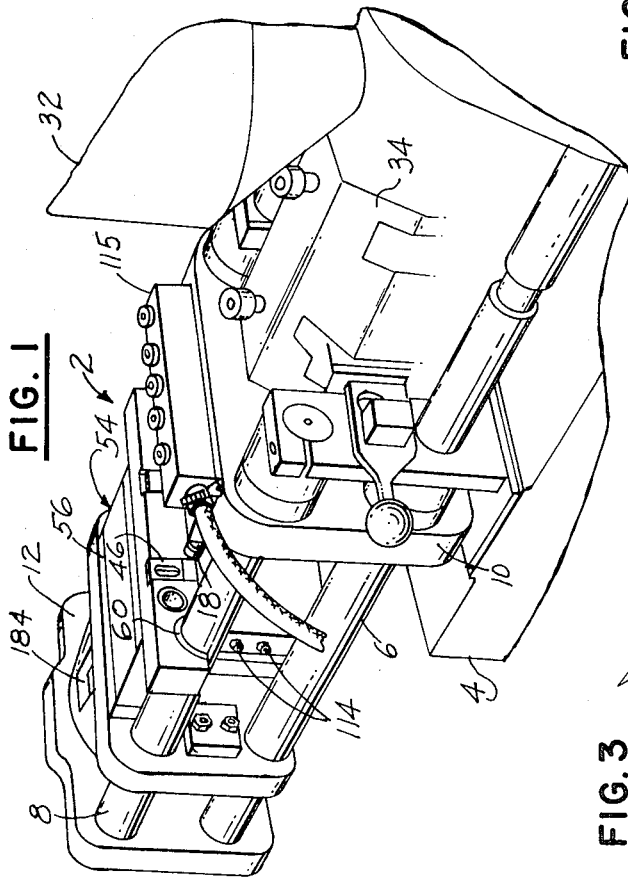
FIG. 1
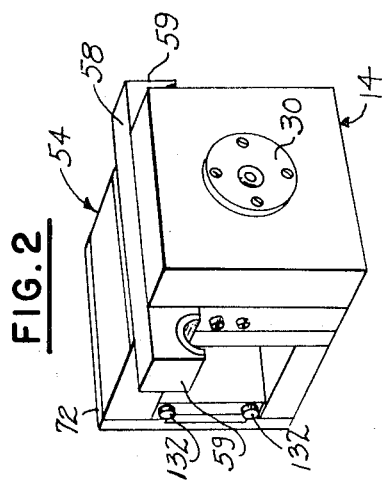
FIG. 2
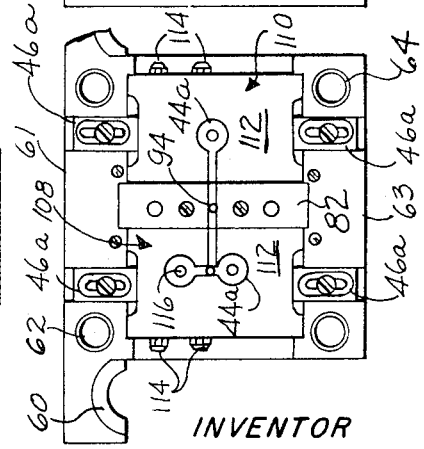
FIG. 3
FIG. 3A
INVENTOR
FRANCIS E. RYDER
By Olson, Trexler, Wolters & Bushnell
Attys

INVENTOR
FRANCIS E. RYDER

By Olson, Trexler, Walters & Bushnell
Attys

INVENTOR
FRANCIS E. RYDER

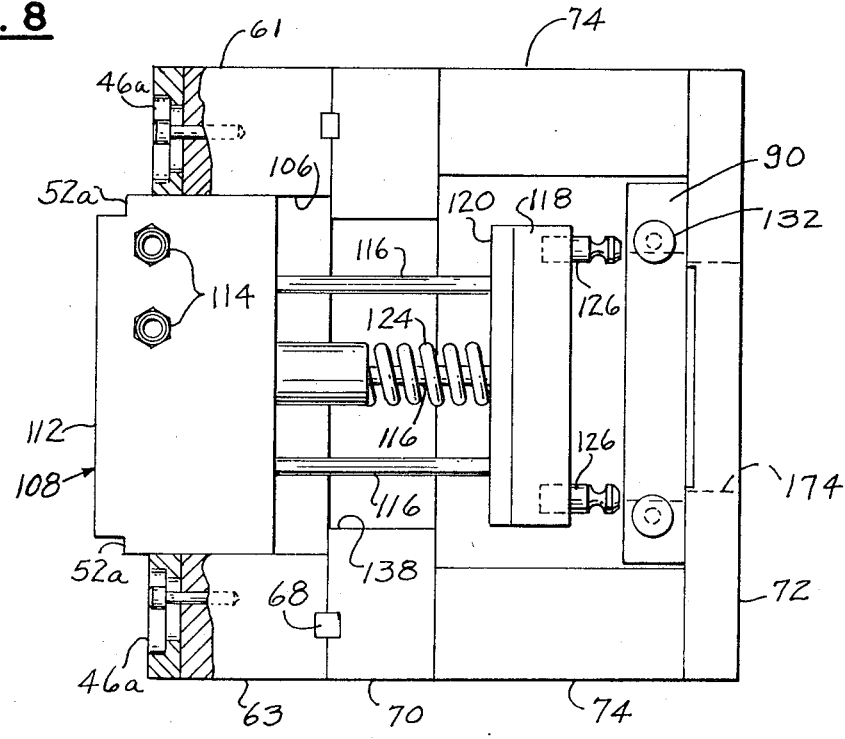
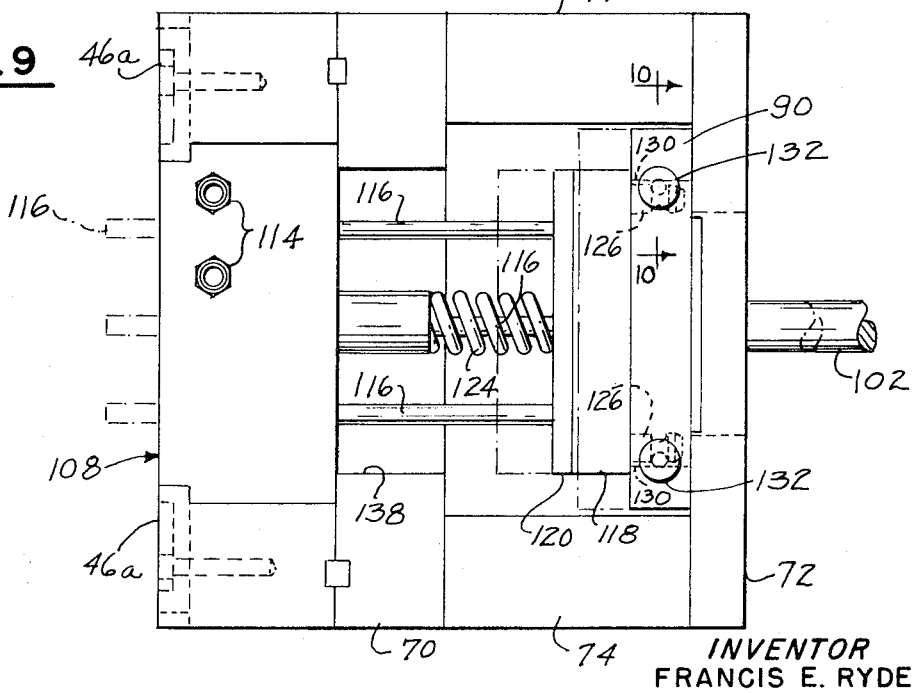

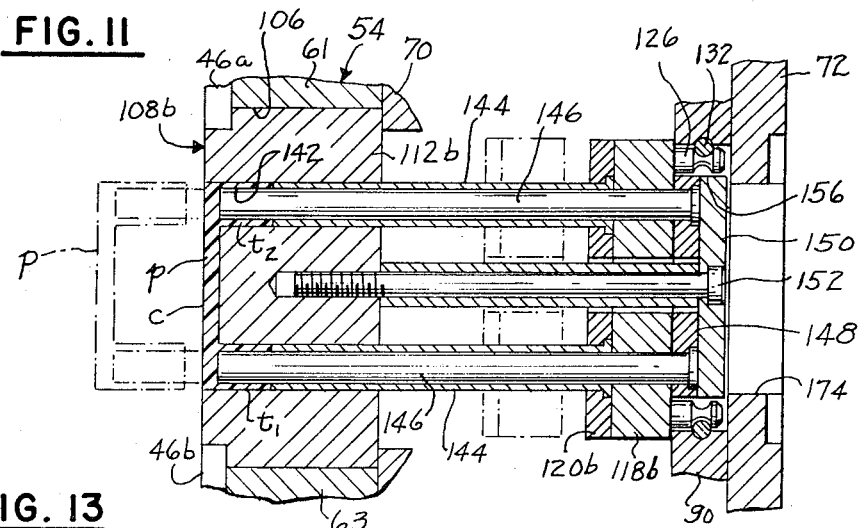
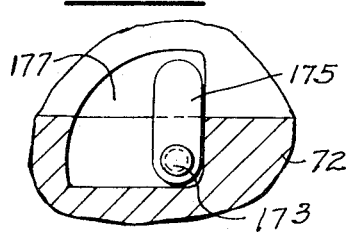
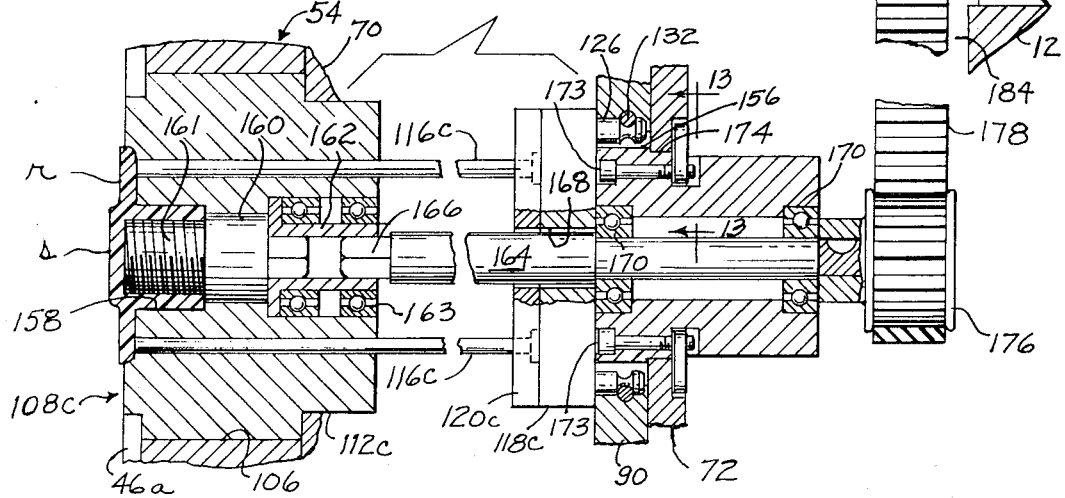
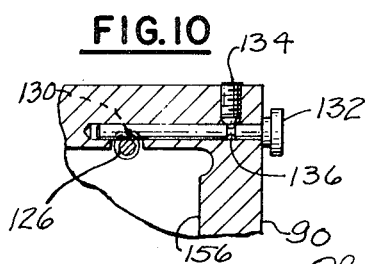
INVENTOR
FRANCIS E. RYDER

MOLDING APPARATUS

BACKGROUND OF THE INVENTION

This invention relates to improvements in molding apparatus, particularly injection molding of the type used for molding plastic workpieces, although the principles of the invention are applicable to die casting and other types of molding as well.

In apparatus of the foregoing type, it is desirable that the molds be constructed for receiving interchangeable inserts or cavity plates so that the same basic apparatus can be used for molding a wide variety of parts. Often, however, the time required for removing an insert and replacing it with another one is extensive resulting in undue "down time" for the machine.

OBJECTS AND SUMMARY OF THE INVENTION

It is an object of this invention to provide molding apparatus in which mold inserts may be readily mounted on and removed from cooperating mold members so as to reduce the changeover time required when it is desired to set up the molding apparatus for molding different parts.

It is a further object of this invention to provide an apparatus of the type stated in which the mold insert is an assembly including a cavity-forming block and an ejector mechanism that may be readily coupled and uncoupled to the ejector drive of the machine, the ejector mechanism of the insert assembly being particularly designed for the part to be molded.

It is another object of this invention to provide an apparatus of the type stated in which the insert assembly and the machine can be readily arranged for unscrewing from the blocks screw-threaded molded products.

It is a still further object of the present invention to provide an apparatus of the type stated in which water cooling lines for the mold are conveniently located.

In accordance with the foregoing, one form of the apparatus comprises companion mold members that are mounted on a molding machine for movement to and from open and closed positions, and with one of the mold members including leader pins that engage in guide bores in the other mold member. Each mold member has openings that are separated by a divider bar, and insert assemblies are positioned in the openings and thus lie on opposite sides of the divider bar. The insert assemblies include recess portions forming the cavity for the piece parts to be molded, and the divider bar has a transverse runner for supplying molding material from the mold sprue to the recess or cavity portions of the blocks. Each block is removably retained in place in the associated opening by readily releasable clamps. One of the mold members includes an ejector drive mechanism with return pins and an ejector pin that extends into the divider bar of the mold member for imposing ejecting force on the plastic in the runner. The insert assembly also includes ejector structure that extends into the block for imposing ejecting force on the piece part portion of the recess. The ejector structure may be a pin or pins or a tubular member or members depending upon the configuration of the molded part.

In another form of the invention, the insert blocks are designed for molding threaded parts, and the back side of each block has a rotatable socket member for receiving a drive rod that is driven by an ejector motor.

BRIEF DESCRIPTION OF THE FIGURES

In the drawings:

FIG. 1 is a fragmentary perspective view of molding apparatus constructed in accordance with and embodying the present invention;

FIG. 2 is a perspective view of the closed mold assembly shown separated from the remainder of the molding apparatus;

FIG. 3 is an exploded side elevational view of the mold of FIG. 2;

FIG. 3A is a view as seen along line 3A—3A of FIG. 3;

FIG. 3B is a sectional view taken along line 3B—3B of FIG. 3;

FIG. 8 is a side elevational view, partially broken away and in section, and showing the insert assembly partially inserted into the mold member;

FIG. 9 is a view similar to FIG. 8 and showing the insert assembly in its operative position in the mold member;

FIG. 10 is a fragmentary sectional view taken along line 10—10 of FIG. 9;

FIG. 11 is a fragmentary side elevational view, partially in section, and showing a modified form of insert assembly;

FIG. 12 is a side elevational view, partially broken away and in section, and showing a further modified form of insert assembly; and FIG. 13 is a fragmentary sectional view taken along line 13—13 of FIG. 12.

DETAILED DESCRIPTION

Figure 4:
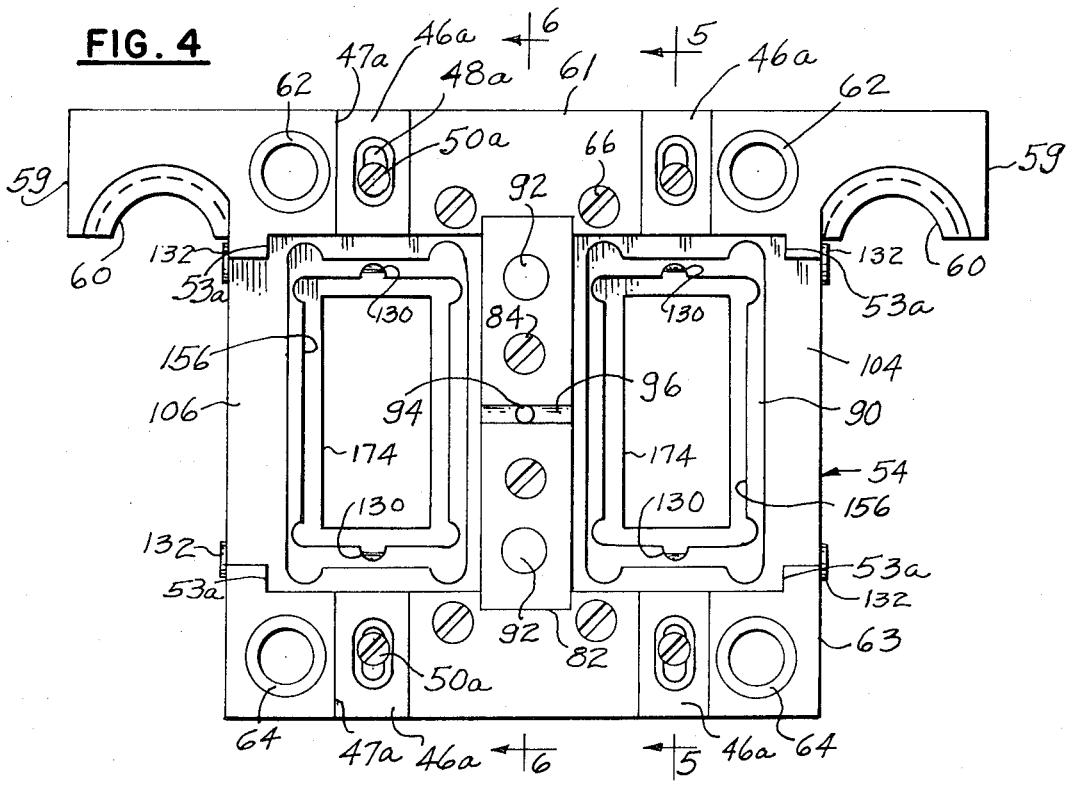
FIG. 4 is an enlarged front elevational view of the mold member of FIG. 3A but with the insert assemblies removed therefrom.

Referring now in more detail to the drawing, 2 designates molding apparatus comprising a base or frame 4 upon which are provided parallel support bars 6, 8, one set being shown with there being a like pair on the opposite side of the apparatus 2. Mold backing structures 10, 12 are carried by the support bars 6, 8 in a manner known in the art.

Mounted on a vertical face of the mold backing structure 10 is a mold member 14 having a generally rectangular body with a front face 16, and projecting from the face 16 at the four corners of the body of the mold member 14 are four leader pins 18. At the front face 16 the mold member 14 is provided with openings 20, 22 which extend to the sides of the mold member 14 so that the openings 20, 22 are both forwardly and laterally open. The openings 20, 22 are separated by a divider bar 24 that is secured to the mold member 14 by screws 26. Centrally of the divider bar 24 is a sprue opening 28 which communicates with a sprue bushing 30 (FIG. 2) at the back side of the mold member 14. Plastic is injected through the sprue bushing 30 in a conventional manner from a hopper 32. The hopper feeds to an injection ram of known type that is enclosed within a housing 34. The divider bar 24 is also provided with a transverse runner 36 for purposes presently more fully appearing.

Disposed within the openings 20, 22 are inserts in the form of blocks 38, 40, each of which contain recesses 42, 44 which define portions of a mold cavity and will thus have a shape in accordance with that of the molded part. As will be noted from FIG. 3B, the blocks 38, 40 are on opposite sides of the divider bar 24, and each of the recesses 42, 44 are seen to have runner portions which communicate with the divider bar runner 36. The blocks 38, 40 are flush with the front face 16 and are retained within the openings 20, 22 by clamps 46, there being two clamps used for each block 38 or 40, as the case may be. For this purpose each clamp 46 is disposed in a vertical slot 47 at the front face 16, and each clamp 46 includes a longitudinal slot 48 for receiving a screw 50. When the clamps 46 are in clamping position they engage undercuts 52 at opposite edges of the blocks 38, 40. By loosening the screws 50, the respective clamps 46 may be shifted into or out of clamping relationship with the blocks 38, 40 so that the latter may be readily mounted on or removed from the mold member 14. The blocks 38, 40 are restrained against lateral outward movement when in the openings 20, 22 by shoulders 53 at opposite sides of the mold member 14.

Figure 5:
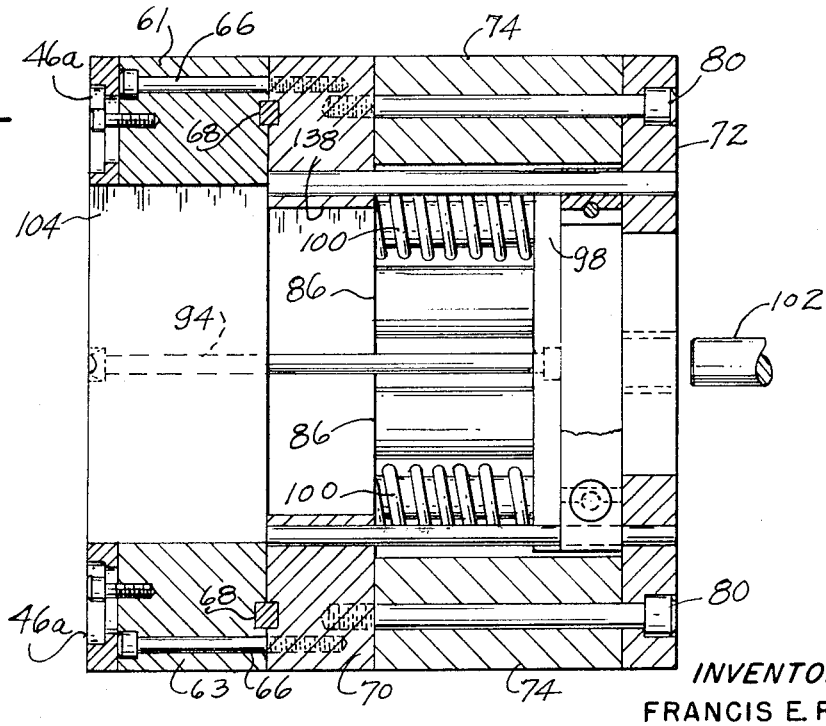
FIGS. 5 and 6 are sectional views taken along lines 5—5 and 6—6 respectively of FIG. 4.
Figure 6:
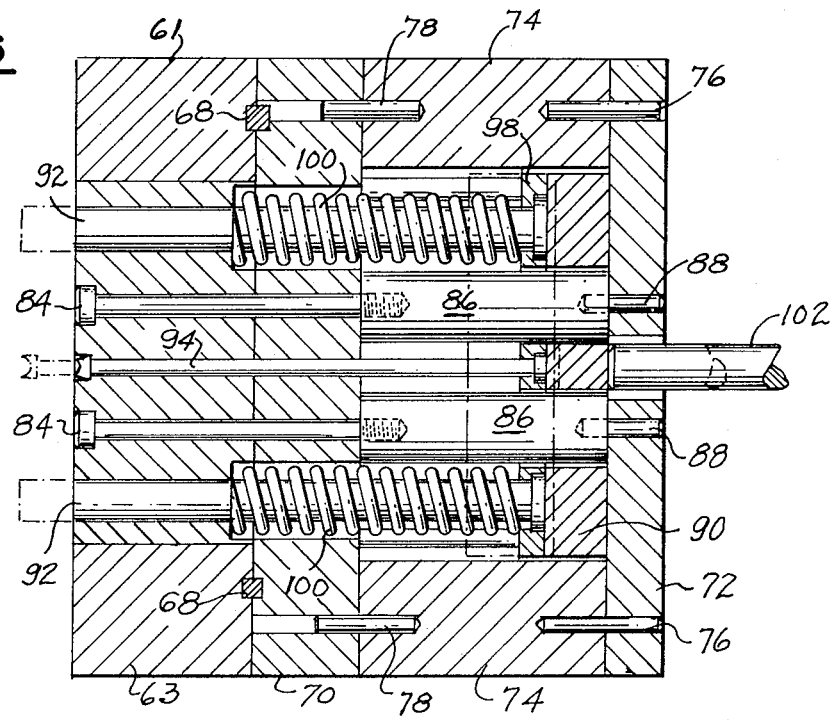

Provided for cooperation with the mold member 14 is an additional mold member 54 that is suitably attached through plate 56 to the structure 12. The mold member 54 includes a front section 58 having lateral extensions 59, 59 with downwardly opening semicircular bearings 60, 60 for slidable suspension from the upper support bars 6, 8. The lateral extensions 59, 59 form part of an upper rail 61 having upper bushings 62, 62 for slidably receiving the upper pair of leader pins 18, 18 of the mold member 14. The front section of the mold member 54 also includes a lower rail 63 having bushings 64, 64 for slidably receiving the lower pair of leader pins 18, 18. As best seen in FIGS. 5 and 6, bolts 66 and keys 68 may be used to secure the upper and lower rails 61, 63 to a support plate 70. Between the support plate 70 and the back plate 72 are ejector rails 74, 74 that are assembled in alignment with the back plate 72 and support plate 70 by dowel pins 76, 78. Bolts 80 pass through the back plate 72 and ejector rails 74 and are threaded into the support plate 70.

A divider bar 82 interfits with the upper and lower rails 61, 63 and is flush with the front faces thereof. The divider bar 82 receives bolts 84, 84 which pass through the support plate 70 and are threaded into support pillars 86, 86, the latter in turn being assembled with the back plate 72 by dowel pins 88. Within the ejector rails 74, 74 and surrounding the support pillars 86, 86 is a movable ejector plate 90 for supporting ejector return pins 92, 92 which are adapted to project slidably into the divider bar 82. Also carried by the ejector plate 90 is a sprue ejector rod 94 that projects into the divider bar 82 at a transverse recess or runner portion 96 which, when the mold members 14, 54 are closed, cooperates with the runner 36 previously described for providing a passage through which the plastic molding material may flow to the other parts of the molding cavities, as will be presently more fully described.

The return pins 92 and the sprue ejector rod 94 are clamped to the ejector plate 90 by a retainer plate 98 that is secured to the ejector plate 90 by screws or other suitable fasteners (not shown). Return springs 100, 100 surround the return pins 92, 92 for imposing return force on the ejector plate 90, to move the latter to the right as seen for example in FIGS. 5 and 6. An ejector drive rod 102 passes through the back plate 56 and engages the ejector plate 90 centrally thereof for moving the ejector plate to the left (FIG. 6) whereby the return pins 92, the ejector rod 94 and the ejector plate assembly move to the broken line positions shown in FIG. 6. The ejector drive rod 102 lies within the housing or structure 12 and may be actuated in a known manner.

As will best be seen from FIGS. 4 and 5, the mold member 54 has openings 104, 106 which are separated by the divider bar 82 as in the case of the mold member 14, previously described. Furthermore, the openings 104, 106, as with the mold member 14, open both forwardly and laterally. The openings 104, 106 are adapted to receive insert assemblies 108, 110 (FIGS. 3A and 7) which are normally of like construction. The insert assemblies include insert blocks 112 which are companion to the insert blocks 38, 40 and include recesses 42a, 44a which cooperate with the recesses 42, 44 in the blocks 38, 40 to define (along with the runner portions 36, 96) the mold cavity when the mold members 14, 54 are brought together such that the respective blocks are in flush engagement. For retaining the blocks 112 in place, there are shoulders 53a which serve the same purpose as the shoulders 53, previously described. In addition, there are clamps 46a that are positioned in slots 47a and held therein by screws 50a that pass through longitudinal slots 48a in the respective clamps 46a, all being similar to the corresponding elements previously described with respect to the mold member 14. Likewise, the blocks 112 each have undercuts 52a at which the clamps 46a are disposed.

Each of the blocks 112 include inlet and outlet cooling line fittings 114, 114 which are presented to the lateral portions of the openings 104, 106 to facilitate ready attachment of water cooling lines to the blocks 112. While not shown, a like arrangement of cooling line fittings 114 may be applied to the insert blocks 38, 40 shown in FIG. 3B. The cooling fluid lines may be suitably connected by flexible tubing (not shown) to a water manifold 115.

Figure 7:
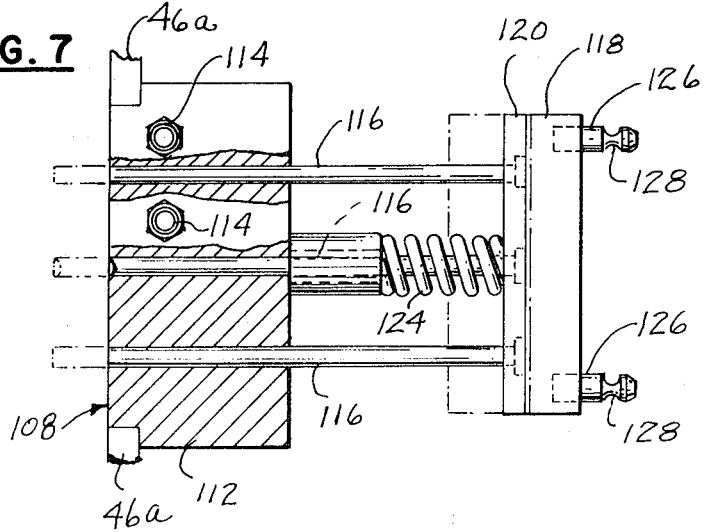
FIG. 7 is a side elevational view of an insert assembly which forms part of the present invention.

Referring now more particularly to FIGS. 7-9 it will be seen that the insert assembly 108 (and likewise the assembly 110) is a unit that includes a plurality of piece-part ejector pins 116 which are of a number corresponding to the number of piece-parts to be molded in the block 112 or to the number of pins that are required for proper ejection of the molded part therefrom. By way of example but not of limitation, it is seen that in the form of the invention shown upper and lower ejector pins (FIG. 7) are provided, one for each of the circular cavity portions shown as comprising the cavity portion 44a (FIG. 3A) and a center ejector pin 116 for the small runner portion joining the two circular cavity portions. The ejector pins 116 are, of course, slidable in the block 112, and in addition are connected to an ejector holder 118. The ejector holder 118 may include a suitable clamping plate 120 which retains the ejector pins 116 in place. The center ejector pin 116 of FIG. 7 may be surrounded by a bushing 122 against which a return spring 124 abuts, the latter also surrounding the center ejector pin 116 and abutting the clamping plate 120. For the block 112 of the insert assembly 110 (See FIG. 3A) only one ejector pin 116 may be required for the single circular cavity portion shown.

Secured to the ejector holder 118 and projecting rearwardly therefrom are opposed pins 126, 126 each having diametrically reduced annular grooves 128, 128. The pins 126, 126 are adapted to project through slots 130, 130 in the ejector plate 90. Removably provided on the ejector plate 90 are locking pins 132, 132 which are removably held in place by assemblies 134 which are threaded into the ejector plate 90, as shown in FIG. 10. Each assembly 134 is a conventional structure that includes a spring biased ball detent that engages in an undercut slot 136 in the pin 132.

From the foregoing it will be apparent that each of the insert assemblies 108, 110 may, as a unit, be readily inserted into or removed from the mold member 54. The units themselves may be assembled and adjusted separately from the mold member and thereafter mounted in the mold member 54. Thus, with the clamps 46 retracted, the insert assembly 108 may be inserted into the opening 106, as shown in FIG. 8, and with the ejector holder 118 passing through the central and somewhat smaller opening 138 in the support plate 70 and into the space between the ejector rails 74, 74. The mold member 54 is laterally open at the ejector plate 90 which renders access to the pins 132, 132 quite convenient. Thus, the locking pins 132, 132 are pulled out a sufficient amount to allow the pins 126, 126 to be inserted into the slots 130, 130, whereby the insert assembly assumes its assembled position within the mold member 54, as shown in FIG. 9. The pins 132 are then pushed into the ejector plate 90 until the ball detent devices 134 snap into place, and thus locking the ejector plate 90 with the ejector holder 118 of the insert assembly. Thereafter, the clamps 46a may be shifted inwardly to clamping position and the screws 50a tightened. The connections to the water cooling fittings 114 may then be made.

In use, apparatus 2 is operated in the usual manner so that the mold members 14, 54 are brought together. Plastic is then injected through the sprue bushing 30 to fill the mold cavity. Thereafter, the mold members are separated and the ejector drive rod 102 operated to move the ejector pins 116, 94 to the broken line positions shown in FIGS. 6 and 9 to eject the piece-part from the mold cavity.

FIG. 11 is similar to FIG. 5 but shows a modified form of molding apparatus in which the insert assembly 108b has a recess portion forming a mold cavity 142 that is shaped to mold a piece-part $p$ with two tubular sections $t_1$, $t_2$ that are spaced apart and joined by a connector or central section $c$. In such case, the mating block 38 or 40 on the mold member 14 will simply be a flat plate that fits flush against the forwardly presented surface of the insert block 112b to form a closure for the mold cavity 142. In the insert assembly 108b, however, tubular ejectors 144 are used. The broken lines in FIG. 11 show the apparatus as the piece-part $p$ is being ejected from the mold cavity. The ejector holder 118b cooperates with its clamping plate 120b to retain the ends of the tubular ejectors 144. In addition, guide pins 146, 146 are telescoped within the tubular ejectors 144, 144 and which extend into the insert block 112b. The rear ends of the guide pins 146 are clamped between members 148, 150 which lie within a clearance opening 156 in the ejector plate 90. There is an opening 156 on each side of the divider bar 82, as seen in FIG. 4, one for each of the two assembled plates 148, 150. Thus, the same ejector plate 90 may be used for insert assemblies 108b as for the insert assemblies 108, 110. The members 148, 150 are maintained in fixed position by a bolt 152 passing therethrough and threaded into the block 112b. Spacing of the members 148, 150 with respect to the block 112b is provided by a spacer sleeve 154.

FIGS. 12 and 13 show a further modified form of the invention that is used for molding threaded parts, FIG. 12 being taken along the same plane with respect to the apparatus as is FIG. 11. In the arrangement of FIG. 12, however, the insert assembly 108c has an insert block 112c with a recess portion forming a mold cavity 158 for molding a threaded piece-part $s$ with an annular flange or rim $r$. The mold cavity portion of the companion insert block for the mold member 14 will, of course, be shaped to conform to the remainder of the external surface of the piece-part. The block 112c has a rotatable core piece 160 projecting into the cavity 158, and the forward end of the core piece 160 contains the thread 161 about which the plastic is molded. The other end of the core piece 160 has an axial head that fits non-rotatably in a socket 162, the latter being journalled in spaced bearings 163 in the block 112c. Ejector rods 116c are slidably in the block 112c for imposing ejecting pressure against the rim $r$ of the piece-part $s$. The rear ends of the ejector rods 116c are held by holder 118 in cooperation with clamping plate 120c.

A rotatable ejector drive rod 164 is used with the insert assembly 108c for rotating the core piece 160 to unscrew the molded piece-part $s$ for ejection thereof. In this regard it is noted that the external configuration of the piece-part $s$ in some way departs from circular cross-section so that the piece-part $s$ does not rotate in the mold cavity upon rotation of the core piece 160. The rotatable rods 164 (one for each of the two insert assemblies in the mold) are rotated in timed relationship in a known manner with the ejector plate 90 (driven by rod 102, FIG. 9) so that the axial movement of various parts of piece-part $s$ is at the same rate. The rod 164 has a drive head 166 which fits non-rotatably in the socket 162 but is axially slidable therein. It will be noted that the rod 164 passes through clearance holes 168 in the plates 118c, 120c and is journalled in bearings 170, 170 in a journal block 172 which projects rearwardly of the back plate 72. It will also be noted that the journal block 172 passes through the clearance opening 156 in the ejector plate 90 and also through another clearance hole 174 in the back plate 72, the clearance hole 174 being smaller than clearance hole 156 which is in turn smaller than hole 138. Screws 173 and clamps 175 retain the journal block 172 rigidly assembled with the back plate 72, the clamps 175 being disposed in notches 177 on the back side of the back plate 72. Keyed or otherwise rigidly mounted on the rear end of the rod 174 is a pulley 176 which is driven by a belt 178 which is, in turn, driven by a pulley 180 on the output shaft of an electric motor 182. The motor 182 is mounted on the structure 12 which has a hole 184 (see also FIG. 1) for receiving the belt 178.

The insert assembly 108c may be readily mounted in mold member 54 by assembly of the block 172, the rod 164 and the pulley 176 and with clamps 175 out of the way or retracted. Then the entire sub-assembly may be inserted through the opening 106. The clamps 175 may then be rotated to engage the notches 177 and the screws 173 tightened. The motor 182, if not already mounted in place, may be then mounted on the structure 12 and the belt 178 trained around the pulleys 176, 180. Thereafter, the block 112 with assembled pins 116c and members 118c and 120c are positioned through the mold member opening 106, and the pins 132 are secured by the lock pins 134 in the ejector plate 90. The clamps 46a are then positioned over the front of the block 112c and tightened.

It should be noted, however, that in some instances the pins 116 will not be required. This will depend upon the shape of the molded piece. In that event the pins 116 and the members 118c, 120c are eliminated from the insert assembly. Furthermore, while one half of the mold may utilize the insert of FIG. 12, the other half may utilize the insert of FIG. 11. Thus, the present apparatus is capable of utilizing tubular, pin type, or rotatable ejectors simultaneously.

The invention is claimed as follows:

1. Molding apparatus comprising companion mold members movable to and from open and closed positions, insert assemblies in said mold members and having recesses cooperating to provide a mold cavity when the mold members are in their closed positions, means removably mounting said insert assemblies in said mold members, and an ejector plate movably mounted in one of said mold members and having means for imposing ejecting force on a portion of a molded piece in said cavity; the insert assemblies that are in said one mold member each including a block that contains a recess portion that forms part of said mold cavity, ejector means movable in each said block for imposing ejecting force on the part of said molded piece in said recess portion thereof, a holder for said ejector means, and cooperating means on said holder and said ejector plate for detachably securing said holder to said ejector plate; said cooperating means including a fastener element projecting laterally from said ejector plate and said one mold member being laterally open to provide access to said fastener element; said block, said ejector means, said holder and the means thereon constituting a removable and replaceable unit for said one mold member.

2. Molding apparatus according to claim 1 including return pins secured to said ejector plate, and spring means surrounding said return springs for returning said pins from an ejecting position to a molding position.

3. Molding apparatus according to claim 1 in which said ejector means includes a pin.

4. Molding apparatus according to claim 1 in which said ejector means includes a tubular element.

5. Molding apparatus according to claim 1 in which said ejector means comprises a rotatable member for ejecting a threaded molded part from said one mold member.

6. Molding apparatus according to claim 1 in which said cooperating means includes at least one pin on said holder engageable with said fastener element on said ejector plate.

7. Molding apparatus comprising a mold member having openings at one side, insert assemblies each including blocks in said openings and each having a recess that forms part of a mold cavity, a divider bar between said blocks and having a runner for conveying molding material to the recesses in said blocks, clamps secured to the front face of said mold member and an adjacent front face of each block for removably retaining the blocks in said openings, said apparatus including ejector drive mechanism, ejector structure at the rear of each block and including means for imposing ejecting force at said recesses, and means for removably connecting said ejector structure to said ejector drive mechanism; said last-named means comprising a fastener projecting through one of the openings at the side of said mold member and through said ejector drive mechanism, and a member secured to said ejector structure and slidably interfitting with said fastener.

8. Molding apparatus according to claim 1 including a plurality of openings, an insert block in each opening, and means constituting parts of said insert assemblies for operatively supporting for simultaneous operation ejector means comprising a tubular element, a pin, and a rotatable element.

9. Molding apparatus according to claim 1 in which said apparatus includes support bars, and said one mold member has means for slidably suspending the same from said support bars.

10. Molding apparatus comprising a mold member having at one face thereof a forward and laterally presented opening, said mold member also having means defining a hole that is spaced from said face, said hole being smaller than said opening, ejector means in said mold member and having means for releasable coupling with an ejector holder, said ejector means having a hole that is smaller than the first-mentioned hole and spaced therefrom and telescopically receiving said ejector holder, and a member having hole that is smaller than the hole in the ejector means and adjacent to which said ejector holder is positioned when said ejector means is retracted, and means projecting through the hole in said member for operating said ejector means, the three holes and the opening being generally aligned.

11. Molding apparatus according to claim 10 including rotatable ejector drive mechanism projecting through the hole in said member and also through the hole in said ejector means.

12. Molding apparatus according to claim 11 including ejector means in said opening and telescoped with said drive mechanism.

13. Molding apparatus according to claim 10 in which said opening is defined at least in part by elements that are keyed together.

* * * * *